April 29, 1924.
J. MILNE
COMPRESSOR
Filed Dec. 15, 1922
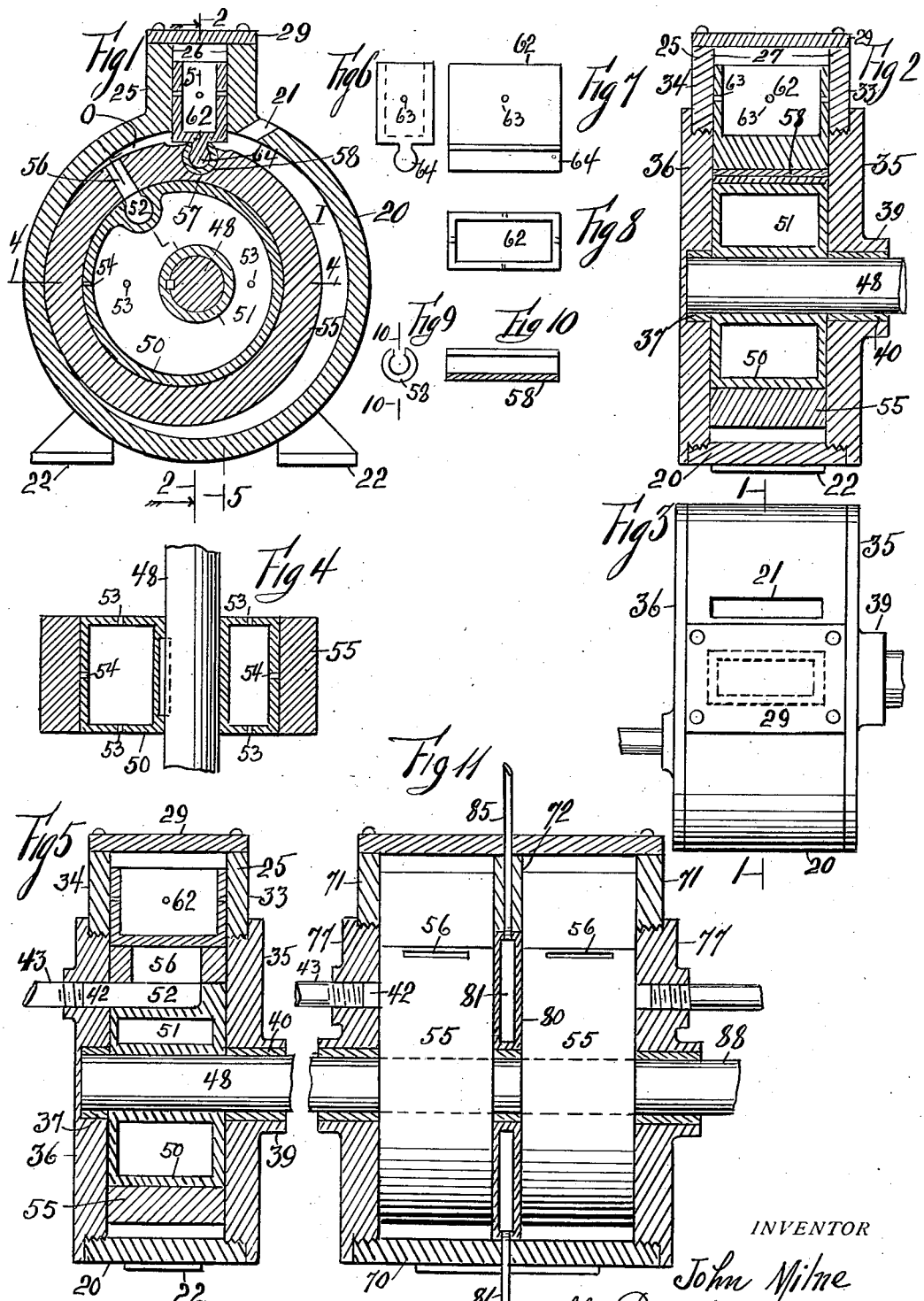
INVENTOR
John Milne
By A. A. De Romerville ATTORNEY Patented Apr. 29, 1924.

1,491,813

UNITED STATES PATENT OFFICE.

JOHN MILNE, OF NEW YORK, N. Y.

COMPRESSOR.

Application filed December 15, 1922. Serial No. 607,076.

*To all whom it may concern:*

Be it known that I, JOHN MILNE, a citizen of the United States, and resident of the borough of Manhattan, city of New York, in the county of New York and State of New York, have invented certain new and useful Improvements in Compressors, of which the following is a specification.

This invention relates to a compressor for compressing fluids.

Its object is the production of a compressor of simple construction which is devoid of the ordinary inlet and outlet valves. A second object of the invention is the production of a compressor with the chamber of its cylinder divided into an inlet compartment and an outlet compartment. A third object of the invention is the production of compressor in which the outlet ports thereof function as a check valve when not registering and not discharging the operating fluid therethrough.

The organization of the invention comprises a cylinder with an inlet and outlet port formed therein, and a revolving piston in the cylinder having a port which coacts with the ports in the cylinder. A ring with a port is slidably supported on the piston which coacts with the port thereof and with the outlet port of the cylinder.

In the accompanying drawings Fig. 1 represents a section of an exemplification of the compressor as on the line 1, 1 of Fig. 3; Fig. 2 shows a section of Fig. 1 on the line 2, 2; Fig. 3 indicates a top plan view of the compressor; Fig. 4 is a section of Fig. 1 on the line 4, 4; Fig. 5 represents a section of Fig. 1 on the broken line 5, 5; Fig. 6 indicates an elevation of a detail; Fig. 7 shows a left hand side view of Fig. 6; Fig. 8 shows a top plan view of Fig. 7; Fig. 9 represents an end view of a detail; Fig. 10 is a section of Fig. 9 on the line 10, 10; and Fig. 11 represents a section similar to Fig. 5 with a modification.

Referring to Figs. 1 to 10 a cylinder is indicated at 20 which has extending therethrough the inlet port 21 and has formed thereto the feet 22.

A hollow hub 25 with the inner guide walls 26 and 27 extends from the cylinder 20. A cover 29 is provided for the hub 25. Side walls 33 and 34 are formed with the cylinder 20. A cover 35 is detachably connected to the side wall 33 and a cover 36 is detachably connected to the side wall 34.

A bushing 37 is supported in the cover 36. A hub 39 with a bushing 40 is formed with the cover 36.

An outlet port 42 for the compressor is formed in the cover 36 and is provided with the outlet piping 43.

A shaft 48 extends into the cylinder 20 and is supported in the bushings 37 and 40.

A piston 50 having the chamber 51 and the outlet port 52 in its circumferential surface is located in the cylinder 20 and is fastened to the shaft 48. The sides of the piston 50 bear against the inner faces of the sides of the cylinder 20. The port 52 during the revolutions of the piston 50 can register with the port 42 of the cover 36. Oil holes 53 and 54 for a lubricant are formed in the walls of the piston 50.

A piston ring 55 is slidably supported on the piston 50 and has formed therein the outlet port 56 and the seat 57 for the bushing 58. A sliding partition 62 with oil holes 63 for a lubricant is guided in the hub 25 and has extending therefrom the rounded lug 64 which is detachably locked to the bushing 58. The partition 62 with the ring 55 divides the chamber of the cylinder 20 into the inlet compartment I and the outlet compartment O. The sides of the ring 55 bear against the inner faces of the side of the cylinder. To use the compressor the shaft 48 is turned by means, not shown, by virtue of which the piston 50 revolves and the air or other fluid operated upon is drawn through the inlet port 21 into the cylinder having the wall 20. During the revolution of the piston the air or other fluid entering the cylinder 20 is compressed against the sliding partition 62 in the compartment O. The compressed fluid is forced through the ports 56, 52, 42 and flows through the piping 43. The partition 62 seals one portion of the chamber in the cylinder 20 from the other portion. When the ports 56, 52 and 42 are not in register they function as a check valve for the fluid in the cylinder 20 and the fluid in the piping 43 which has been discharged from the cylinder. The sides of the partition 62 in the cylinder 20 bear against the inner faces of the sides of the cylinder.

In the modification indicated in Fig. 11 a double cylinder is indicated at 70 with the side walls 71 and the central partition wall 72. Covers 77 similar to 36 are provided for the walls 71. A detachable partition 80 is secured in the cylinder 70 which divides it into two chambers, and may have formed therewith the chamber 81. A water inlet pipe 85 and water outlet pipe 86 may be provided for the chamber 81. A shaft 88 extends through both the chambers 74 and 75 and has fastened thereto pistons with the piston rings 55 as already described.

The operation of the compressor with the double cylinder 70 indicated in Fig. 11 is similar to that described for the compressor having the cylinder 20.

Various modifications may be made in the invention without departing from the spirit thereof and the present exemplification is to be taken as illustrative and not limitative thereof.

Having described my invention what I desire to secure by Letters Patent and claim is:—

1. In a compressor the combination of a cylinder with an inlet port, a shaft extending into the compressor, a cylindrical piston eccentrically fastened to the shaft and having a port formed therewith, a ring having a port slidably supported on the piston, and a sliding partition hinged to said ring and slidably extending through a wall of the cylinder.

2. In a compressor the combination of a cylinder with an inlet port, a revolving cylindrical piston eccentrically located in the cylinder and having an outlet port, a ring slidably supported on the piston and having an outlet port, a cover for the cylinder having an outlet port, and a sliding partition hinged to said ring and extending through the wall of the cylinder all of said outlet ports registering with each other at a predetermined position of said piston.

3. In a compressor the combination of a cylinder, with an inlet port, a revolving piston eccentrically located in the cylinder, a ring slidably supported on the piston, a sliding partition extending through the cylinder with one end thereof hinged to said ring and dividing the chamber of the cylinder into an inlet compartment and an outlet compartment, said cylinder having an outlet port connecting with said outlet compartment and said ring and piston having outlet ports registering with the outlet port of said cylinder at a predetermined location in each revolution of said piston.

4. In a compressor the combination of a cylinder, a revolving piston eccentrically located in the cylinder, a ring slidably supported on the piston, a sliding partition extending through the cylinder and hinged to said ring dividing the chamber of the cylinder into an inlet compartment and an outlet compartment, ports for the cylinder, piston and ring for the flow of a fluid into one of said compartments and discharged from the other, the outlet ports of the compressor covered when the fluid is not discharged therefrom.

5. In a compressor the combination of a cylinder having an inlet port, a revolving piston with an outlet port located in the cylinder, means to divide the chamber of the cylinder into an inlet compartment and an outlet compartment, a cover for the cylinder having an outlet port, the outlet port in the piston and cover constituting a discharge passage for the fluid operated upon after compression and functioning as a check valve when not registering.

6. In a compressor the combination of a cylinder with an inlet port, a revolving piston with an outlet port eccentrically located in the cylinder and bearing against the sides thereof, a ring with an outlet port slidably supported on the piston a sliding partition extending through the cylinder with one end thereof hinged to said ring, and bearing against the sides of the cylinder, the partition with said ring dividing the chamber of the cylinder into an inlet compartment and an outlet compartment, a cover for the cylinder forming one of its sides and having an outlet port therein, the outlet ports in the ring, piston and cover, constituting a discharge passage for the fluid operated upon after compression and functioning as a check valve when not registering.

Signed at the borough of Manhattan, city of New York, in the county of New York and State of New York, this 14th day of December, A. D. 1922.

JOHN MILNE.